(12) United States Patent
Chang

(10) Patent No.: US 6,220,805 B1
(45) Date of Patent: *Apr. 24, 2001

(54) SLOTTED SCREW AND METHOD, AND APPARATUS FOR FORMING A SLOT IN A SEMI-PRODUCT OF A SCREW PRIOR TO THREAD FORMATION

(76) Inventor: Chih-Feng Chang, 7F-2, No. 31, Kai-Hsuan Rd., Tainan (TW)

(*) Notice: Subject to any disclaimer, the term of this patent is extended or adjusted under 35 U.S.C. 154(b) by 0 days.

This patent is subject to a terminal disclaimer.

(21) Appl. No.: 09/309,675

(22) Filed: May 11, 1999

Related U.S. Application Data

(62) Division of application No. 09/097,777, filed on Jun. 15, 1998, now Pat. No. 5,904,623.

(51) Int. Cl.⁷ .................................................. F16B 23/00
(52) U.S. Cl. ........................ 411/403; 411/419; 411/393; 470/8
(58) Field of Search .................. 411/417–419, 403–407, 411/393; 470/8–12

(56) References Cited

U.S. PATENT DOCUMENTS

| | | | |
|---|---|---|---|
| 2,037,066 | * 4/1936 | Cook | 411/419 |
| 2,808,087 | * 10/1957 | Vaughn | 411/403 |
| 2,996,093 | 8/1961 | Moore . | |
| 3,188,849 | 6/1965 | Wisebaker et al. . | |
| 3,351,966 | * 11/1967 | Pelochino | 411/419 |
| 3,470,786 | * 10/1969 | Martins | 411/405 |
| 4,485,510 | 12/1984 | Hatter . | |
| 4,538,486 | * 9/1985 | Lutrat | 411/407 |
| 4,805,437 | 2/1989 | Heil, Jr. et al. . | |
| 4,932,234 | 6/1990 | Adachi . | |
| 5,667,443 | * 9/1997 | Allen | 470/12 |

* cited by examiner

Primary Examiner—Flemming Saether
(74) Attorney, Agent, or Firm—Rodman & Rodman

(57) ABSTRACT

The slotted screw is made with an apparatus for forming a slot in a semi-product of a screw prior to thread formation and includes a punch and a die mechanism. The die mechanism includes a tubular member, and an elongated die member formed integrally with a slot-forming plate which is located at a front end portion thereof and which has a uniform-thickness flat middle portion and two side portions that are wider than the middle portion. The semi-product can be compressed between the punch and the slot-forming plate of the die member in a central bore in a high-hardness block, which is fixed in the tubular member, to form the slot. Accordingly, the slot has a uniform-width middle portion and two end portions which are wider than the uniform-width middle portion. When threads are formed on the semi-product by means of a lathe, no projections are created in the uniform-width middle portion of the slot, thereby permitting a wedge-shaped end of a screwdriver to engage fittingly the uniform-width middle portion of the slot.

2 Claims, 8 Drawing Sheets

SLOTTED SCREW AND METHOD, AND APPARATUS FOR FORMING A SLOT IN A SEMI-PRODUCT OF A SCREW PRIOR TO THREAD FORMATION

This appln is a Divisional of Ser. No. 09/097,777 filed Jun. 15, 1998, U.S. Pat. No. 5,904,623.

BACKGROUND OF THE INVENTION

1. Field of the Invention

This invention relates to a slotted screw and a method for making a slotted screw, more particularly to a slotted screw and method, and apparatus for forming a slot in an end surface of a semi-product of a screw prior to thread formation.

2. Description of the Related Art

Referring to FIG. 1, in a case where threads of a set screw 1 are formed prior to formation of a slot 10 (shown in slotted lines) in an upper end surface of the screw 1 by a lathe in a known manner, several tabs 11 (only one is shown) may be created on the screw 1 at positions adjacent to two end portions of the slot 10. In this case, it is necessary for the screw 1 to undergo vibration processing in order to have the tabs 11 drop therefrom. To enable removal of the tabs 11 from the screw 1 by vibration, the screw 1 is made of high speed steel, thereby resulting in increased manufacturing costs. Because the slot 10 is formed by means of a lathe, the production efficiency is reduced, and a large amount of metal waste is created.

Referring to FIG. 2, in a case where a slot 10' is formed in an upper end surface of a screw 1' prior to formation of threads by a lathe in a known manner, several sharp projections 12 may be formed on the screw 1' in two end portions of the slot 10', thereby obstructing insertion of a wedge-shaped end of a screwdriver into the slot 10'. As a result, this slot forming process is seldom adopted by manufacturers of slotted-screws.

SUMMARY OF THE INVENTION

The object of this invention is to provide a slotted screw and method, and apparatus for forming rapidly a slot in a semi-product of a screw prior to thread formation by forging so as to reduce the manufacturing costs of the screw and so as to minimize creation of metal waste.

According to this invention, an apparatus for forming a slot in a semi-product of a screw prior to thread formation includes a punch and a die mechanism. The die mechanism includes a tubular member, and an elongated die member formed integrally with a slot-forming plate which is located at a front end portion thereof and which has a uniform-thickness flat middle portion and two side portions that are wider than the middle portion. The semi-product can be compressed between the punch and the slot-forming plate of the die member in a central bore in a high-hardness block which is fixed in the tubular member, to form the slot. Accordingly, the slot has a uniform-width middle portion and two end portions which are wider than the uniform-width middle portion. When threads are formed on the semi-product by means of a lathe, no projections are created in the uniform-width middle portion of the slot, thereby permitting a wedge-shaped end of a screwdriver to engage fittingly the uniform-width middle portion of the slot.

BRIEF DESCRIPTION OF THE DRAWINGS

Other features and advantages of this invention will become apparent in the following detailed description of the preferred embodiment of this invention, with reference to the accompanying drawings, in which.

DETAILED DESCRIPTION OF THE PREFERRED EMBODIMENT

Figure 3:
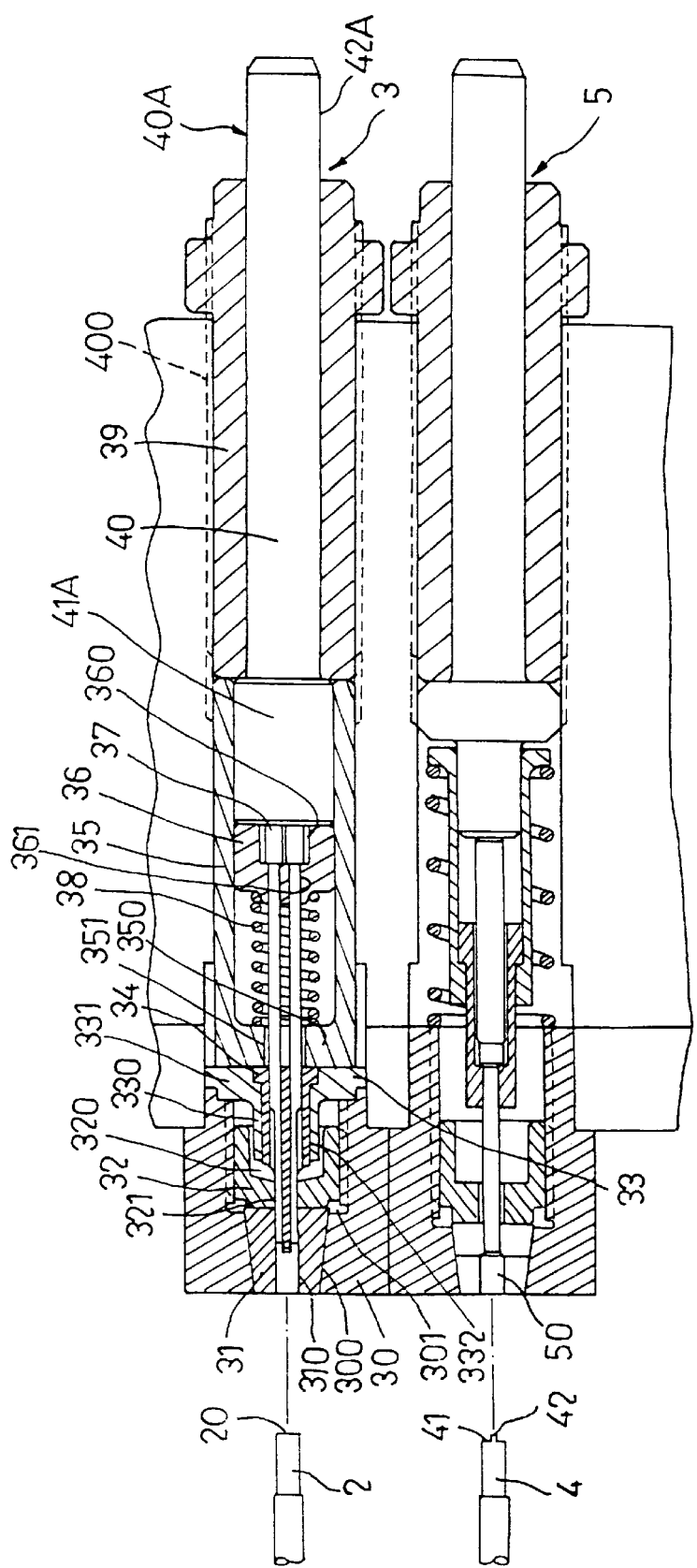
FIG. 3 illustrates the preferred embodiment of an apparatus for forming a slot in an end surface of a semi-product of a screw prior to thread formation according to this invention.

Referring to FIG. 3, the preferred embodiment of an apparatus for forming a slot in an end surface of a screw prior to thread formation includes a slot forming device and a flattening device. The slot forming device consists of a punch 2 and a die mechanism 3. The flattening device consists of a punch unit 4 and a die unit 5. The punch 2 and the punch unit 4 are mounted respectively relative to the die mechanism 3 and the die unit 5 in a known manner. The punch 2 has a flat pressing surface 20. The punch unit 4 has an end surface 41 formed with a rib 42. The die unit 5 has a cylindrical cavity 50 formed in a surface thereof.

The die mechanism 3 includes a generally circular tubular member 30, a truncated conical high-hardness block 31, a nut 32, a sleeve 33, an elongated die member 34, a hollow horizontal cylinder 35, a pushing block 36, two parallel ejector rods 37, a coiled compression spring 38, a hollow adjustment bolt 39, a die bed 40 and a push rod 40A.

The circular tubular member 30 is fixed on the die bed 40 in a known manner, and has a front end surface with a truncated conical chamber 300 formed therein, and a rear end surface with a threaded chamber 301 which is formed therein and which is communicated with the conical chamber 300. The punch 2 is movable relative to the tubular member 30. The truncated conical chamber 300 has an outer end and an inner end which is larger than the outer end but smaller than the threaded chamber 301 in diameter.

The truncated conical high-hardness block 31 is made of tungsten carbide, and is received fittingly within the truncated conical chamber 300 in the generally circular tubular member 30. A central bore 310 is formed through the block 31.

The nut 32 engages threadably the threaded chamber 301 in the tubular member 30 to contact a rear end surface of the block 31, thereby fixing the block 31 in the circular tubular member 30. A central counterbore is formed through the nut 32 in alignment with the central bore 310 in the block 31, and has a large-diameter rear portion 320 and a small-diameter front portion 321 which is approximate to the central bore 310 in the block 31 in diameter and smaller than the large-diameter rear portion 320 in diameter.

The sleeve 33 has a front portion 330 positioned within the large-diameter rear portion 320 of the central counterbore in the nut 32, a rear flange portion 331 which is larger than the front portion 320 in diameter and which abuts against the rear end surface of the tubular member 30, and a central counterbore 332 which is formed through the sleeve 33 and which has a small-diameter front portion and a large-diameter rear portion that is larger than the front portion of the central counterbore 332 in the sleeve 33.

Figure 4:
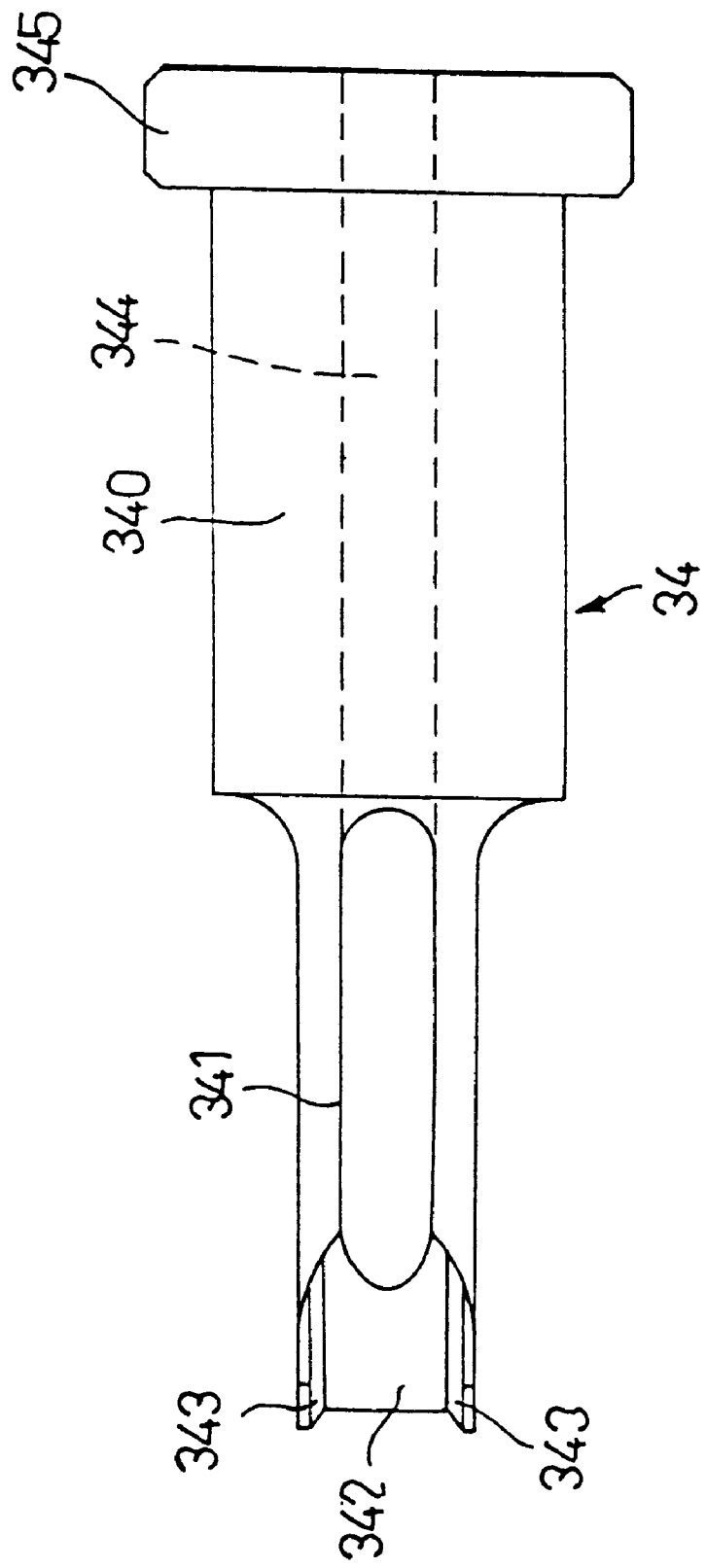
FIG. 4 illustrates an elongated die member of the preferred embodiment.
Figure 4A:
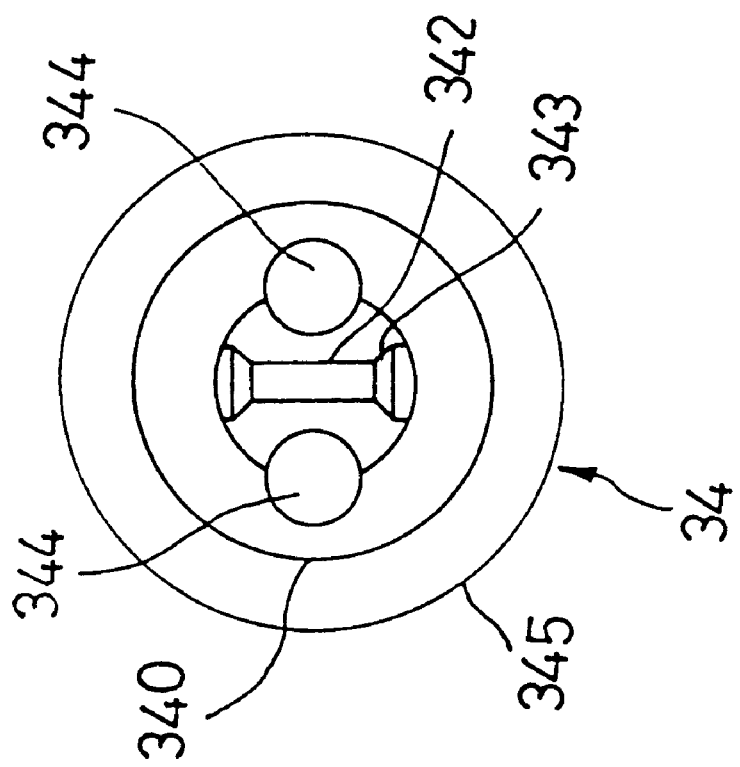
FIG. 4A is an end view illustrating how two axial holes are located relative to a slot-forming plate of the preferred embodiment.
Figure 5:
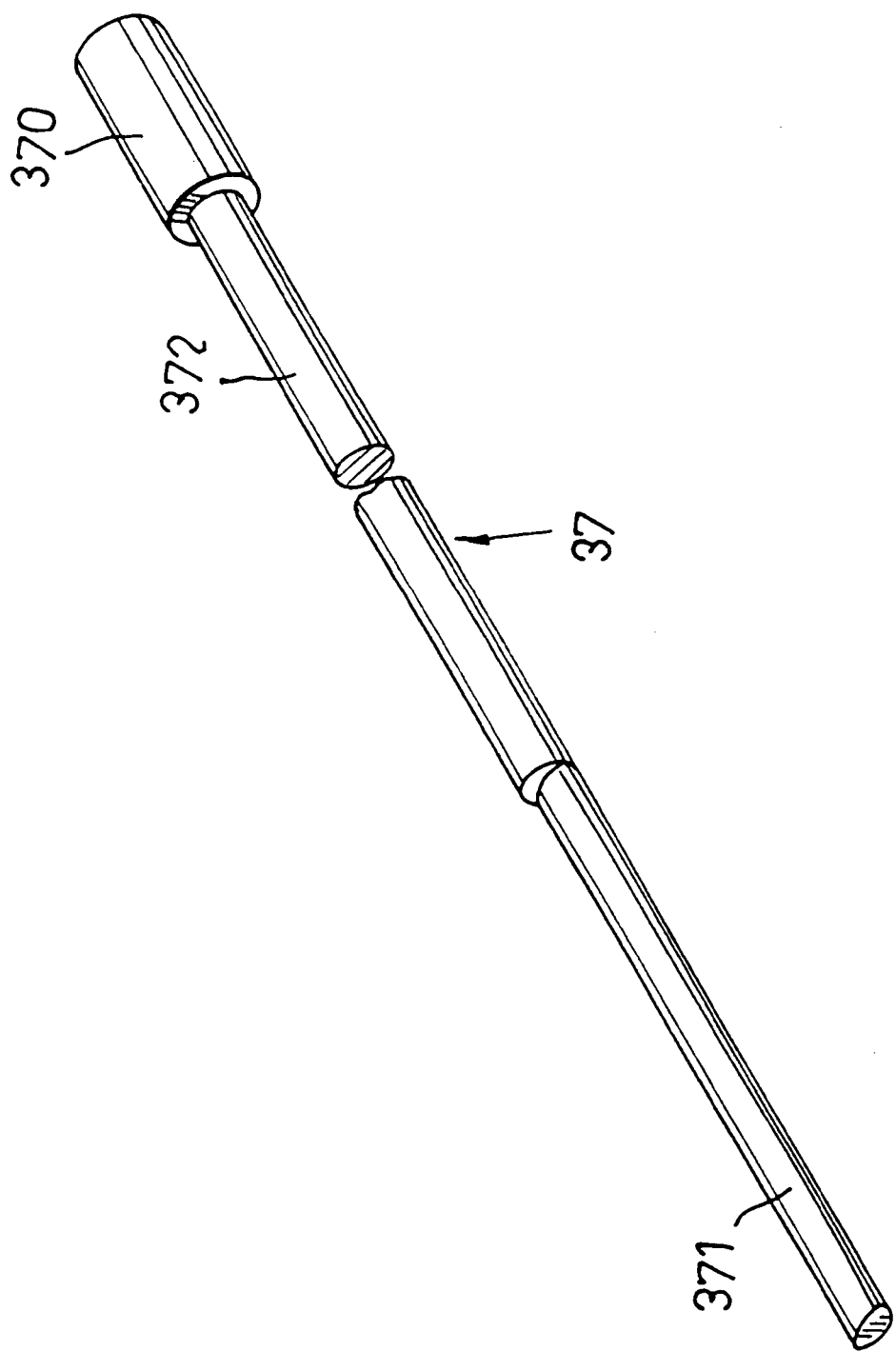
FIG. 5 is a perspective view of an ejector rod of the preferred embodiment.

Referring to FIGS. 3, 4 and 4A, the elongated die member 34 has a generally cylindrical rear portion 340 and a slot-forming plate 341, which is disposed at a front end portion of the die member 34 and which is formed integrally with the rear portion 340. The generally cylindrical rear portion 340 has two axial holes 344, which are formed therethrough and which located on two sides of the slot-forming plate 341. The slot-forming plate 341 extends from the nut 32 into the central bore 310 of the block 31, and has a uniform-thickness flat middle portion 342 and two side portions 343, which are wider than the middle portion 342 so as to be adapted to compress the semi-product between the flat pressing surface 20 of the punch 2 and the slot-forming plate 341 of the die member 34 in the central bore 310 in the block 31, thereby forming the slot in the semi-product 61 (see FIG. 6) to constitute a slotted member 62 (see FIG. 6).

Figure 6:
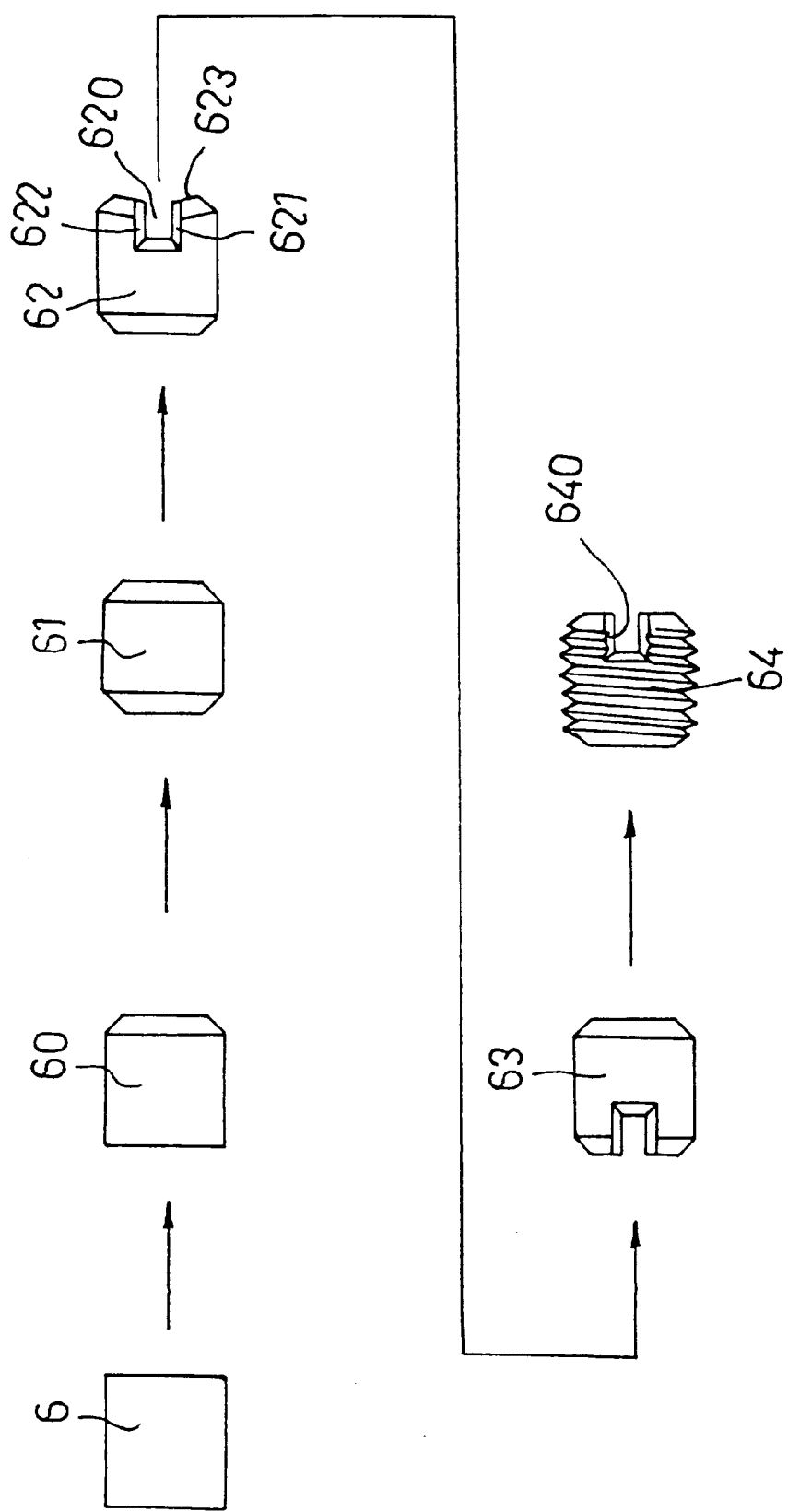
FIG. 6 is a flow chart illustrating a process for forming a slotted screw in which a slot is formed by the preferred embodiment of this invention.

Referring to FIG. 6, the slotted member 62 is formed with a slot 620 which has a uniform-width middle portion 621 and two end portions 622 that are wider than the middle portion 621. As illustrated, the end surface of the slotted member 62 is inclined relative to the axis of the slotted member 62.

Again referring to FIGS. 3, 4 and 4A, the horizontal cylinder 35 abuts against the sleeve 33 so that the adjustment bolt 39 presses the horizontal cylinder 35 and the sleeve 33 against the tubular member 30. The die member 34 has an outwardly extending flange 345 at a rear end thereof, and is received fittingly within the central counterbore 332 of the sleeve 33 in such a manner that the flange 345 is located within the large-diameter rear portion of the central counterbore 332 in the sleeve 33, thereby fixing the die member 34 relative to the die bed 40.

The horizontal cylinder 35 has a vertical front wall 350, which abuts against the sleeve 33 and the die member 34 to clamp the sleeve 33 between the tubular member 30 and the horizontal cylinder 35. The front wall 350 has two holes 351 through which the ejector rods 37 extend respectively.

The pushing block 36 has a rear end surface formed with two counterbores 360. As illustrated, each of counterbores 360 is formed through the pushing block 36, and has a small-diameter front portion and a large-diameter rear portion, which opens to the rear end surface of the pushing block 36.

The ejector rods 37 extend through the counterbores 360 in the pushing block 36, the compression spring 38, and the holes 351 in the horizontal cylinder 35, and into the central bore 310 in the block 31. As illustrated in FIG. 3, the front ends of the ejector rods 37 are located at non-ejecting positions which are somewhat behind the front end of the die member 34. Each of the ejector rods 37 has an enlarged rear end portion 370, a thin front end portion 371 and an intermediate portion 372, which has a circular cross-section. The enlarged rear end portion 370 is larger than the small-diameter front portions of the counterbores 360 in the pushing block 36 but smaller than the large-diameter rear portions of the counterbores 360 in the pushing block 36 in diameter.

The coiled compression spring 38 is sleeved on the ejector rods 37 between the pushing block 36 and the front wall 350 of the horizontal cylinder 35.

The adjustment screw 39 is mounted within a threaded hole 400 in the die bed 40.

The push rod 40A has a large-diameter front portion 41A which is clamped between the pushing block 36 and the adjustment screw 39, and a small-diameter rear portion 42A, which extends through a central bore in the adjustment screw 39. After the slot 620 is formed in the slotted member 62, the push rod 40A can be pushed forward to move the ejector rods 37 relative to the die member 34 against the biasing force of the spring 38 until the front ends of the ejector rods 37 are in front of the front end of the die member 34.

Figure 8:
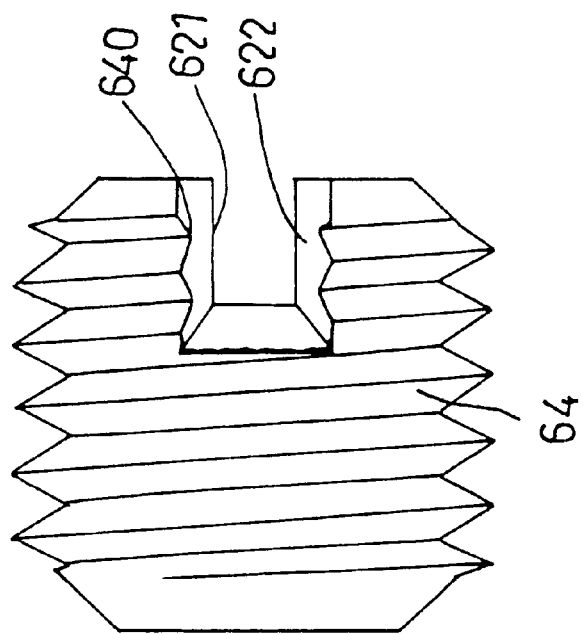
FIG. 8 is a perspective view showing the resulting product of the screw which is formed from the semi-product of FIG. 7 and which is threaded by means of a lathe.
Figure 7:
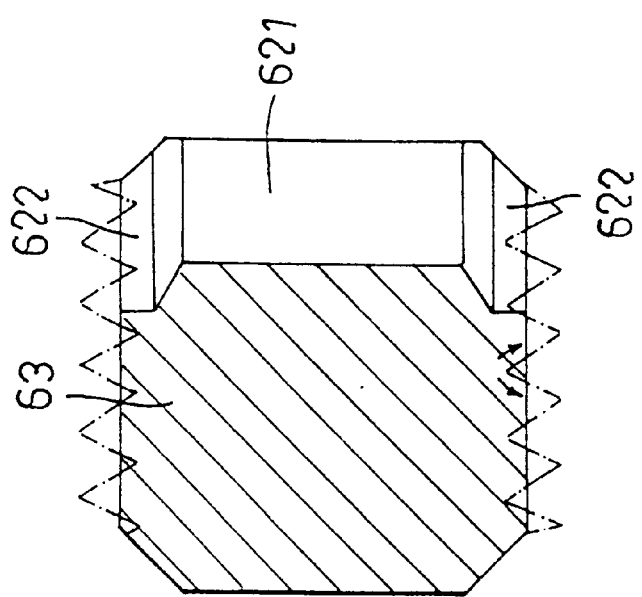
FIG. 7 illustrates a semi-product of a screw which has been processed by the preferred embodiment of this invention.
Figure 8A:
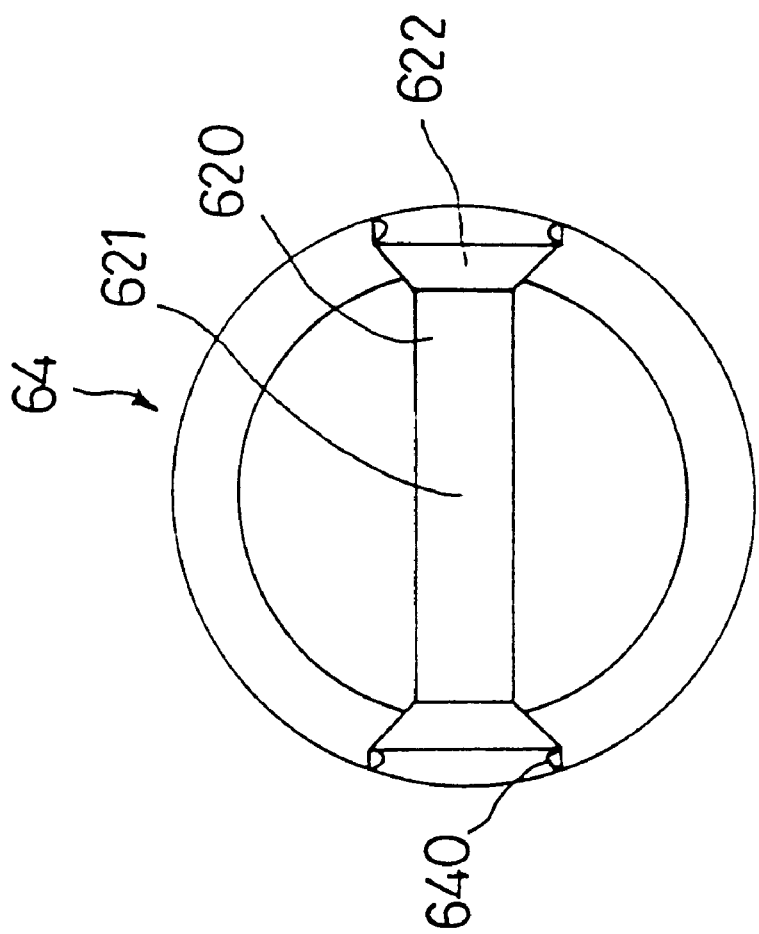
FIG. 8A is an end view of the resulting product of FIG. 8.

Referring to FIG. 6, to form the semi-product 61, a cylindrical blank 6 is placed into the cavity 50 (see FIG. 3) in the die unit 5 (see FIG. 3). Then, a specific punch (not shown) is operated to impact the blank 6 and form a forged member 60 which is then forged into the semi-product 61. After the semi-product 61 is forged into the slotted member 61 by means of the slot forming device which consists of the punch 2 (see FIG. 3) and the die mechanism 3 (see FIG. 3), the slotted member 61 is moved mechanically into the cavity 50 (see FIG. 3) in the die unit 5 (see FIG. 3). Then, the punch unit 4 (see FIG. 3) is operated to move the rib 42 (see FIG. 3) into the slot 620 in the slotted member 62 so as to flatten the surface 623 and a wall of the slotted member 62 defining the slot 620, thereby forming a flattened member 63 (see FIGS. 6 and 7). The flattened member 63 is machined by means of a lathe to form a screw 64 (see FIGS. 6 and 8) with several projections 640 along the threads. Because the projections 640 are formed in the end portions 622 of the slot 620, a wedge-shaped end of a screwdriver (not shown) is unlikely to contact the projections 640 when the former is inserted into the slot 620.

Figure 2:
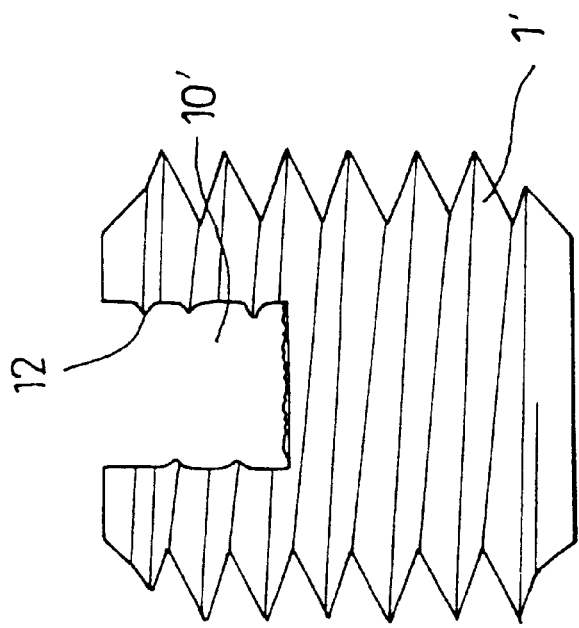
FIG. 2 is a perspective view illustrating how several projections may be formed on a semi-product of a screw in which a slot is formed prior to thread formation in a know manner.
Figure 1:
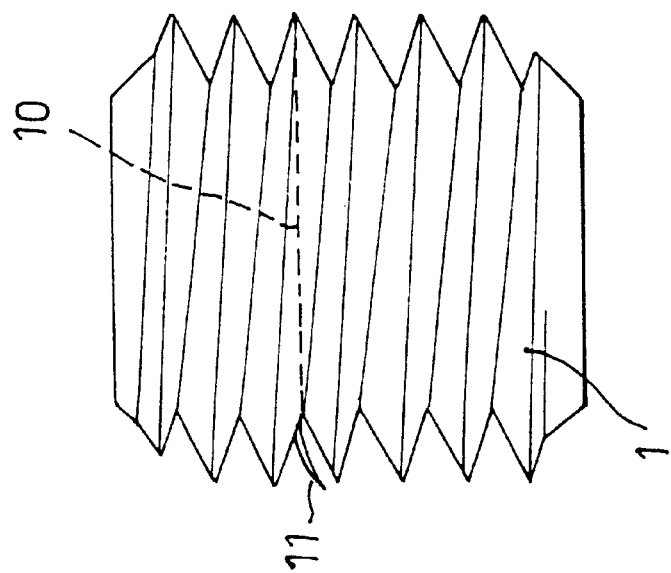
FIG. 1 is a perspective view illustrating how a tab may be created on a semi-product of a screw in which a slot is formed after thread formation in a known manner.

The slotted screw and method, and apparatus of this invention have the following advantages:

(1) Because the semi-product 61 is forged into the slotted member 62, no tab 11 (see FIG. 1) is likely to be formed on the slotted member 62 or the flattened member 63. Accordingly, the semi-product 61 can be made of carbon steel which is cheaper than high speed steel that is the material commonly used for the prior art screw shown in FIG. 1, thereby decreasing the manufacturing costs of the slotted screw.

(2) In a situation where a slot is formed in an end surface of a semi-product of a screw by a lathe in a known manner, the production rate of the screws is about 20~40 pieces per minute. By using the apparatus of this invention, the production rate of the slotted screw can be increased up to 200~250 pieces per minute.

(3) Because the semi-product 61 is forged into the slotted member 62, no metal waste is likely to be created, thereby further reducing the manufacturing costs of the slotted screw.

With this invention thus explained, it is apparent that numerous modifications and variations can be made without departing from the spirit and scope of this invention. It is therefore intended that this invention be limited as indicated only in the appended claims.

I claim:

1. A headless screw having an axis with an axial length and a plurality of threads formed along the axial length, said screw having opposite headless end portions, one of said headless end portions being a driving end formed with a slot to receive a wedge shaped end portion of a screwdriver for driving rotation of the screw, the other headless end portion being without a slot such that rotation of said driving end portion directs the other headless end portion without a slot into and out of a complementary shaped threaded opening, and wherein said slot is formed by a forging operation prior to formation of said threads, and said slot has opposite end sections extending laterally away from the axis of said screw and a middle section between the opposite end sections, the middle section of said slot being of uniform width and the opposite end sections of said slot being wider than the middle section.

2. A method of forming a headless screw comprising,
a) forming a headless cylindrical blank with headless end portions at opposite ends of the cylindrical blank,
b) forging a slot in one end portion of the cylindrical blank before forming threads on the cylindrical blank such that the slot has a uniform width middle section and two opposite end sections that are wider than the middle section to permit insertion of a wedge-shaped end portion of a screwdriver therein for rotation of the screw such that the slotted one end portion of the cylindrical blank constitutes a driving end of the screw, and leaving the other headless end portion of the cylindrical blank without a slot such that the other headless end portion can be directed into a complementary shaped threaded opening, and
c) forming threads on the cylindrical blank after the slot has been formed in the one end portion of the cylindrical blank.

* * * * *